May 24, 1960  R. J. MARING  2,937,861
POTENTIOMETER MOUNTING
Filed March 22, 1956  2 Sheets-Sheet 1
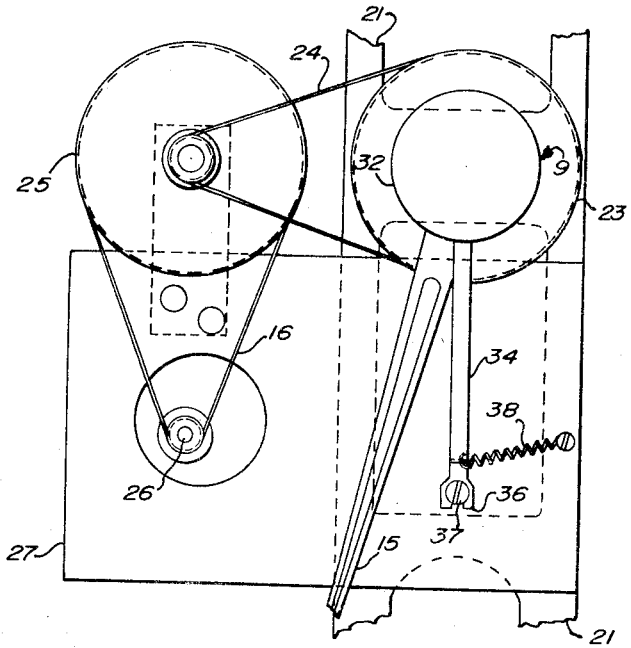
Fig. II
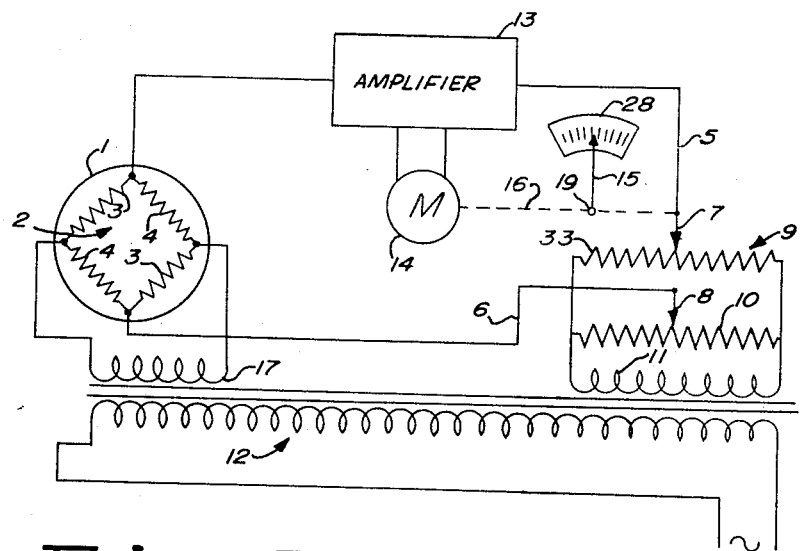
Fig. I
INVENTOR.
ROBERT J. MARING
BY
Marshall, Marshall & Yeasting
ATTORNEYS May 24, 1960
R. J. MARING
2,937,861
POTENTIOMETER MOUNTING
Filed March 22, 1956
2 Sheets-Sheet 2
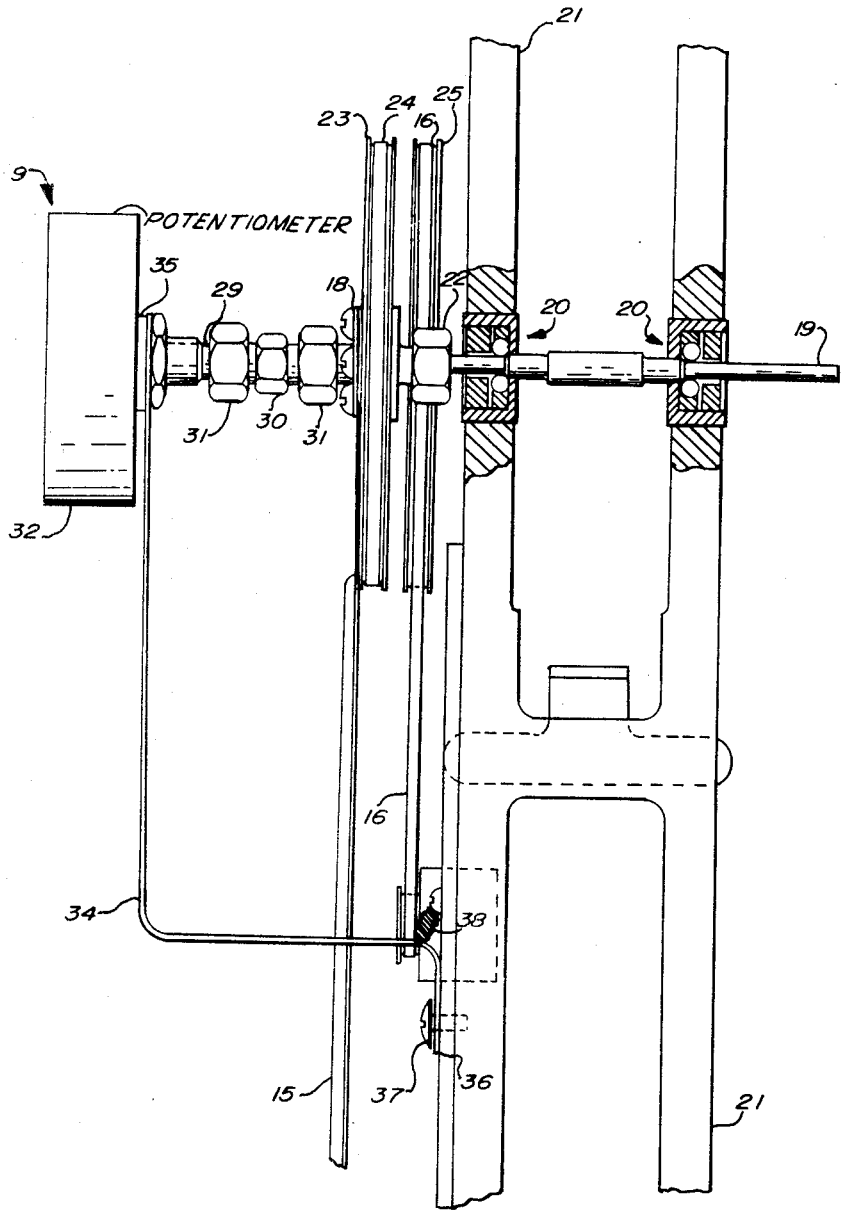
Fig. III
INVENTOR.
ROBERT J. MARING
BY
Marshall, Marshall & Yeasting
ATTORNEYS United States Patent Office 2,937,861
Patented May 24, 1960

2,937,861

POTENTIOMETER MOUNTING

Robert J. Maring, Toledo, Ohio, assignor, by mesne assignments, to Toledo Scale Corporation, Toledo, Ohio, a corporation of Ohio Filed Mar. 22, 1956, Ser. No. 573,246

8 Claims. (Cl. 265—27)

This invention relates to weighing scales of the type wherein the measurement of a variable condition is accomplished by effecting an unbalance of a balanceable network in accordance with variations in the condition and causing potentiometer means to operate as a result of such unbalance and return the network to a balanced condition and in particular to an improved mounting for said potentiometer means.

The principal object of this invention is to provide, in an electronic weighing scale having a motor which drives an indicator shaft and the contact-positioning shaft of a balancing potentiometer, a mounting for the potentiometer wherein the entire potentiometer structure is supported from the indicator shaft, whereby misalignment of said shafts is automatically accommodated. Other objects and advantages are apparent from the following description of a preferred form of the invention.

According to the invention, a potentiometer is supported from an indicator shaft mounted for rotation in the frame of an electronic weighing scale. The potentiometer includes a contact-positioning shaft that is axially aligned with and rigidly coupled to said indicator shaft and a case carried by said contact-positioning shaft. Means are provided for preventing rotation of said case while nevertheless allowing lateral motion of said case to automatically accommodate misalignment of said shafts thus preventing binding in the bearings which support the shafts.

A preferred embodiment of the invention is illustrated in the accompanying drawings.

In the drawings:

Figure I is a schematic wiring diagram showing the essential components of an electronic weighing scale.

Figure II is a fragmentary elevational view of the electronic weighing scale showing an indicator and a potentiometer both of which are driven by the same belt and the supporting framework therefor.

Figure III is an enlarged end elevational view, partly in section, as seen from a position to the right of and looking toward the apparatus shown in Figure II.

These specific figures and the accompanying description are intended to merely illustrate the invention and not to impose limitations on the claims.

Referring to Figure I, an electronic weighing scale embodying the invention includes a load cell 1 that comprises a resistance wire strain gage bridge 2 having resistance elements 3 in two of its legs and resistance elements 4 in the other two legs. The bridge 2 is of an ordinary type used in gages available for measuring strain wherein the elements 3 and 4 are adapted to change in resistance with changes in a condition to be measured, e.g., load applied to the load cell 1. An example of such a bridge is shown and described in U.S. Patent No. 2,689,932 issued to A. J. Hornfeck on September 21, 1954.

In order that the point from which the measurements are made may be adjusted and that measurements of the values from such point may be obtained, there are provided conductors 5 and 6 from the output terminals of the bridge 2 to sliding contacts 7 and 8 of potentiometers 9 and 10 connected at their ends and energized from a secondary winding 11 of a transformer 12. An amplifier and motor control device 13 is connected in circuit with the conductor 5 and controls the operation of a motor 14 which both positions an indicator 15 and the sliding contact 7 through a belt 16. The sliding contact 8 is adapted to be positioned manually. A secondary winding 17 of the transformer 12 is connected to the bridge 2 for energizing the latter.

The potentiometers 9 and 10 with their adjustable contacts 7 and 8 form a bridge circuit, and the output voltage of this circuit opposes the output voltage of the bridge 2 to determine the flow of current through the amplifier and motor control device 13. An unbalance of the output voltage results in an operation of the motor 14 to position the indicator 15 and the contact 7 until the opposing voltages are equal. An adjustment of the contact 8 results in a change in the positions of contact 7 to produce a balance for predetermined conditions to be measured. The positions of contact 7 are representative of the conditions measured, and a changing of these positions by adjustment of contact 8 merely results in an indication of the values from a different zero point.

Referring to Figures II and III, the indicator 15 is fixed to a hub 18 carried on an end of an indicator shaft 19 mounted for rotation in ball bearings 20 supported by an upstanding frame 21. The hub 18 has a slotted and threaded portion upon which a nut 22 is turned to squeeze the slotted portion around the end of the indicator shaft 19 thus rigidly coupling the hub and the shaft. The hub 18 also carries a sheave 23 which is turned by a belt 24 driven by a pulley 25 that is driven in turn from the drive shaft 26 of the motor 14. The motor 14 is shown schematically in Figure I as driving the indicator 15 and the contact 7 of the potentiometer 9 through the belt 16. In the actual structure as shown in Figures II and III, the belt 16 is driven by the drive shaft 26 of the motor 14 and is connected to the indicator 15 and to the contact 7 of the potentiometer 9 through the pulley 25, belt 24 and sheave 23. Both the motor 14 and the pulley 25 are mounted on a supporting plate 27 secured to the upstanding frame 21. The weight of any load within the capacity of the electronic scale placed upon the load cell 1 (Figure I) is indicated by the indicator 15 on an ordinary indicia bearing chart 28 which is shown schematically in Figure I.

When an unbalance of output voltage results in operation of the motor 14 to position the contact 7 of the potentiometer 9, it is of course necessary that the indicator 15 be driven by the motor 14 to exactly the correct point on the chart 28. For this reason, the motor 14 is drivingly connected to the indicator shaft 19 and to the shaft 29 of the potentiometer 9, which shaft 29 positions the contact 7, by means of the sheave 23 that is a common drive means for both shafts, the shafts being axially aligned and rigidly coupled by means of a coupling 30. Thus, it is assured that the shafts 19 and 29 always turn as one. The coupling 30 includes slotted and threaded end portions upon which nuts 31 are turned to squeeze one of the slotted portions around the end of the potentiometer shaft 29 and to squeeze the other of the slotted portions around an extended part of the hub 18 thus rigidly coupling the shafts 19 and 29 in an axially aligned position. As may be seen in Figure III, the entire potentiometer structure including its case 32 is supported from the indicator shaft 19, the case 32 being carried directly by the potentiometer shaft 29.

Mounting the entire potentiometer structure 9 from the indicator shaft 19 allows lateral motion of the potentiometer case 32 to accommodate misalignment of the shafts 19 and 29. As a practical matter, no more than two bearings may be mounted on a rigid shaft without having a binding action occur in the bearings. That is, any misalignment of such a shaft will attempt to cause a wobbling motion which although it cannot actually take place if the three or more bearings are rigidly mounted will cause binding in the bearings. Binding action means friction and friction is always to be avoided in weighing scales if they are to provide accurate weighing indications. In the manufacture and assembly of the indicator shaft 19, the hub 18, the coupling 30, and the potentiometer shaft 29, which altogether are in effect one rigid shaft, misalignment relative to the axis of rotation is almost sure to occur. Four bearings are used to support said rigid shaft, i.e., the two bearings 20 which are rigidly mounted in the frame 21 and the usual two bearings within the case 32 that rotatably support the potentiometer shaft 29. Hence, if the case 32 were to be rigidly supported in any manner, binding action in the bearings would almost certainly occur. However, the improved mounting embodying the invention permits lateral motion of the entire potentiometer structure to occur so that no binding occurs in the bearings even though there is misalignment between the indicator shaft 19 and the potentiometer shaft 29. That is, wobbling motion of misaligned shafts is permitted and two of the four bearings are allowed to move with such motion.

Rotation of the potentiometer shaft 29 which positions the sliding contact 7 may not be permitted to rotate the potentiometer case 32 that non-rotatably supports the bearings for the shaft 29 and also the resistance 33 (Figure 1) for the sliding contact 7. Hence, the case 32 is provided with a radially extending tongue or strap 34 that engages the frame 21 to prevent rotation of the case while nevertheless allowing lateral motion of the case to accommodate misalignment of the shafts 19 and 29. The upper end of the strap or tongue 34 has a hole through which the potentiometer shaft 29 extends and is fixed to a shoulder 35 on the case 32. The lower end 36 of the strap or tongue 34 is shaped in the form of an inverted U and loosely engages the shoulder of a shoulder screw 37. A coil spring 38 one end of which is anchored to the frame 21 urges the U-shaped lower end of the strap or tongue 34 toward the shoulder of the screw 37 and keeps backlash out of the system. Thus, the strap or tongue 34 prevents rotation of the case 32 while nevertheless allowing the case to move laterally.

In summary, a load placed upon the load cell 1 of the electronic weighing scale causes an output voltage from the resistance wire strain bridge 2 to result in operation of the motor 14 which turns the sheave 23 by means of the belts 16 and 24. The sheave 23 turns both the indicator shaft 19 and the potentiometer shaft 29 axially aligned with and rigidly coupled to the indicator shaft until the potentiometer shaft 29 so positions the sliding contact 7 of the potentiometer 9 that a counterbalancing voltage from the potentiometer bridge circuit balances the voltage from the resistance wire strain bridge 2. The position of the sliding contact 7 at the balance point is representative of the weight of the load upon the load cell 1 and a visual indication of such representation is given by the indicator 15 on the chart 28. In order that misalignment of the shafts 19 and 29 does not cause binding in their bearings, the entire potentiometer structure 9 is supported from the indicator shaft 19 so that the potentiometer including the bearings for the potentiometer shaft 29 may move laterally. Means are provided for preventing rotation of the potentiometer case while nevertheless allowing said lateral movement.

Various modifications may be made in details without departing from the scope of the claims.

Having described the invention, I claim:

1. In a weighing scale, in combination, a frame, an indicator shaft mounted for rotation in said frame, a potentiometer supported from said indicator shaft in a location spaced from said frame, said potentiometer including a rotatably mounted potentiometer shaft axially aligned with and rigidly coupled to said indicator shaft and a case carried by said potentiometer shaft, and means for preventing rotation of said case while nevertheless allowing lateral motion of said case to accommodate misalignment of said shafts.

2. In a weighing scale, in combination, a frame, an indicator shaft mounted for rotation in said frame, a sheave fixed to said indicator shaft, a belt for driving said sheave, a potentiometer supported from said indicator shaft, said potentiometer including a rotatably mounted potentiometer shaft axially aligned with and rigidly coupled to said indicator shaft and a case carried by said potentiometer shaft, and means for preventing rotation of said case while nevertheless allowing lateral motion of said case to accommodate misalignment of said shafts.

3. In a weighing scale, in combination, a frame, an indicator shaft mounted for rotation in said frame, a potentiometer supported from said indicator shaft in a location spaced from said frame, said potentiometer including a rotatably mounted potentiometer shaft axially aligned with and rigidly coupled to said indicator shaft and a case carried by said potentiometer shaft, and a strap that is fixed to said case and that engages said frame for preventing rotation of said case while nevertheless allowing lateral motion of said case to accommodate misalignment of said shafts.

4. In a weighing scale, in combination, a frame, an indicator shaft mounted for rotation in said frame, a sheave fixed to said indicator shaft, a belt for driving said sheave, a potentiometer supported from said indicator shaft, said potentiometer including a rotatably mounted potentiometer shaft axially aligned with and rigidly coupled to said indicator shaft and a case carried by said potentiometer shaft, and a strap that is fixed to said case and that engages said frame for preventing rotation of said case while nevertheless allowing lateral motion of said case to accommodate misalignment of said shafts.

5. In a weighing scale, in combination, a frame, an indicator shaft mounted for rotation in said frame, and a potentiometer supported from said indicator shaft in a location spaced from said frame, said potentiometer including a rotatably mounted potentiometer shaft axially aligned with and rigidly coupled to said indicator shaft, a case carried by said potentiometer shaft and a radially extending tongue that engages said frame to prevent rotation of said case while nevertheless allowing lateral motion of said case to accommodate misalignment of said shafts.

6. In a weighing scale, in combination, a frame, an indicator shaft mounted for rotation in said frame, a sheave fixed to said indicator shaft, a belt for driving said sheave, and a potentiometer supported from said indicator shaft, said potentiometer including a rotatably mounted potentiometer shaft axially aligned with and rigidly coupled to said indicator shaft, a case carried by said potentiometer shaft and a radially extending tongue that engages said frame to prevent rotation of said case while nevertheless allowing lateral motion of said case to accommodate misalignment of said shafts.

7. In a weighing scale, in combination, a frame, a scale indicator shaft mounted for rotation in said frame, a potentiometer supported from said indicator shaft, said potentiometer including a resistance member, a slider member and a rotatably mounted potentiometer shaft so coupled to said indicator shaft that it turns as one therewith, one of said members being fixed to said potentiometer shaft for rotation therewith, and means for preventing rotation of said other member while nevertheless allowing lateral motion of said potentiometer.

8. The combination according to claim 7 wherein the means for preventing rotation of said other member includes a strap that is fixed to said potentiometer and that engages said frame.

References Cited in the file of this patent

UNITED STATES PATENTS

| | | |
|---|---|---|
| 243,902 | Hovey | July 5, 1881 |
| 1,242,771 | Clough | Oct. 9, 1917 |
| 2,090,188 | Dahlstrom | Aug. 17, 1937 |
| 2,548,014 | Gealt | Apr. 10, 1951 |
| 2,680,012 | Bozoian | June 1, 1954 |
| 2,708,368 | Kolisch | May 17, 1955 |
| 2,767,974 | Ballard et al. | Oct. 23, 1956 |

OTHER REFERENCES

"YG 209 Fuel Quantity Indicating System," published by Minneapolis-Honeywell, Inc., September 1949 (pages 8-9).